(12) United States Patent
Tsai

(10) Patent No.: US 8,730,536 B2
(45) Date of Patent: May 20, 2014

(54) SCANNING APPARATUS WITH A SHEET SIZE DELECTING MECHANISM

(71) Applicant: Primax Electronics Ltd., Taipei (TW)

(72) Inventor: Shang-Hsien Tsai, Taipei (TW)

(73) Assignee: Primax Electronics Ltd., Neihu (TW)

( * ) Notice: Subject to any disclaimer, the term of this patent is extended or adjusted under 35 U.S.C. 154(b) by 0 days.

(21) Appl. No.: 13/737,493

(22) Filed: Jan. 9, 2013

(65) Prior Publication Data

US 2014/0085687 A1    Mar. 27, 2014

(30) Foreign Application Priority Data

Sep. 21, 2012   (TW) .............................. 101134708 A

(51) Int. Cl.
*H04N 1/04* (2006.01)
*H04N 1/40* (2006.01)

(52) U.S. Cl.
USPC ............ 358/488; 358/496; 358/498; 358/449

(58) Field of Classification Search
CPC .................. H04N 1/00681; H04N 221/00731; H04N 2201/00766; H04N 2201/00796; H04N 2201/00734; H04N 1/193; H04N 1/12; H04N 1/0057; H04N 1/121; H04N 2201/00631; H04N 2201/00619
See application file for complete search history.

(56) References Cited

U.S. PATENT DOCUMENTS

| | | | | |
|---|---|---|---|---|
| 6,014,229 | A  * | 1/2000 | Yun ................................ | 358/449 |
| 6,118,972 | A  * | 9/2000 | Yamazaki et al. ............ | 399/370 |
| 6,901,820 | B2 * | 6/2005 | Imahara ........................ | 73/865.8 |
| 7,672,025 | B2 * | 3/2010 | Luo ............................... | 358/486 |
| 8,467,110 | B2 * | 6/2013 | Tanaka .......................... | 358/475 |

* cited by examiner

*Primary Examiner* — Cheukfan Lee
(74) *Attorney, Agent, or Firm* — Kirton McConkie; Evan R. Witt

(57) ABSTRACT

A scanning apparatus includes a scanning module and a sheet size detecting mechanism. The scanning module is used for acquiring an image of a paper sheet. The sheet size detecting mechanism includes a first sheet guide part, a second sheet guide part, and a controlling unit. The first sheet guide part and the second sheet guide part are contacted with two parallel edges of the paper sheet, respectively. A light-emitting unit is disposed on the second sheet guide part. The light-emitting unit is used for projecting a light beam onto an optical sensing element of the scanning module. According to the light beam, the optical sensing element generates a sensing signal. According to the sensing signal, a distance between the two parallel edges of the paper sheet is acquired.

11 Claims, 8 Drawing Sheets

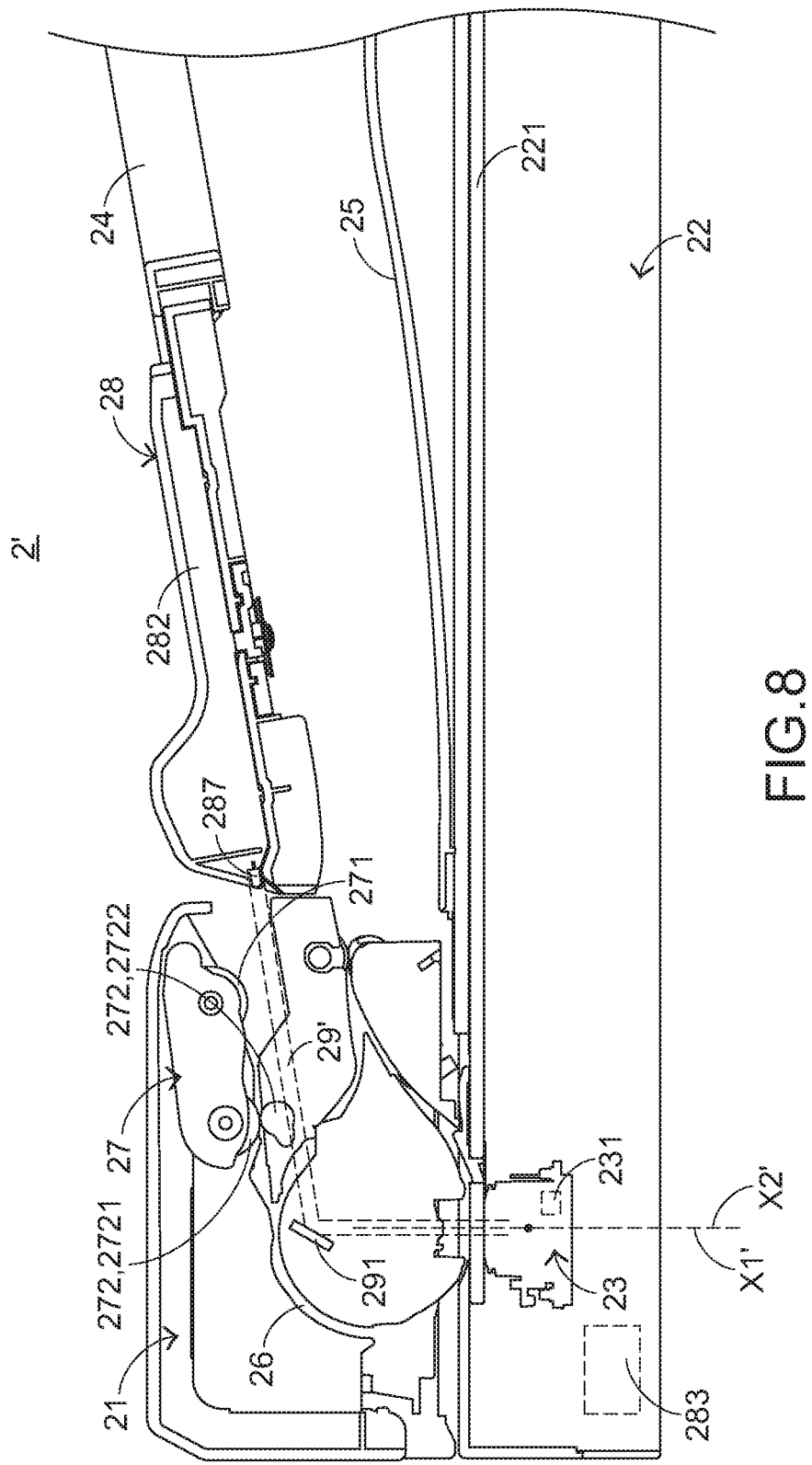

SCANNING APPARATUS WITH A SHEET SIZE DELECTING MECHANISM

FIELD OF THE INVENTION

The present invention relates to a scanning apparatus, and more particularly to a scanning apparatus with a sheet size detecting mechanism.

BACKGROUND OF THE INVENTION

With the maturity of automatic sheet feeding technologies, automatic document feeders are widely used in a diversity of document processing machines such as scanners, printers, and multifunction peripherals. An automatic document feeder is used for successively feeding a stack of sheet-like documents into the document processing machine so as to implement associated operations in a labor-saving manner. Generally, the document processing machine is usually equipped with a sheet size detecting mechanism to be collaboratively used with the automatic document feeder. For smoothly processing the document, before the document is fed into the document processing machine by the automatic document feeder, the size of the document is detected by the sheet size detecting mechanism.

FIG. 1 is a schematic perspective view illustrating a conventional sheet size detecting mechanism disclosed in Taiwanese Patent No. 00588545. FIG. 2 is a schematic top view illustrating a logic plate and a sensing module of the sheet size detecting mechanism as shown in FIG. 1. As shown in FIGS. 1 and 2, the sheet size detecting mechanism 1 comprises a sheet input tray 11, a logic plate 12, and a sensing module 13. The sheet input tray 11 comprises a sheet holder 111 and two opposed sheet guides 112 and 113. The relative positions between the sheet guides 112 and 113 are adjustable. That is, the sheet guides 112 and 113 are movable toward each other or away from each other in order to clamp both sides of the paper sheet. The sensing module 13 is fixed on a bottom surface of the sheet input tray 11. The logic plate 12 is connected with the sheet guide 113. Consequently, the logic plate 12 and the sheet guide 113 may be synchronously moved. The logic plate 12 is a strip-shaped plate. In addition, plural featured structures 121 are formed on a surface of the logic plate 12. By moving the sheet guide 113 to comply with the width of the paper sheet, a relative motion between the logic plate 12 and the sensing module 13 is caused and plural digital signals are generated. According to the digital signals, the sheet size can be judged. This sheet size detecting mechanism, however, still has some drawbacks. For example, the strip-shaped logic plate 12 is costly. In addition, the use of the logic plate 12 occupies much space of the sheet input tray 11.

For solving the above drawbacks, a sheet size detecting mechanism for saving space of the sheet input tray is disclosed in for example U.S. Pat. No. 6,070,048. FIG. 3 is a schematic perspective view illustrating a sheet size detecting mechanism disclosed in U.S. Pat. No. 6,070,048. As shown in FIG. 3, the sheet size detecting mechanism 4 comprises a sheet guide 41 with a rack part 411, a circular gear 42, and a variable resistor 43. The rack part 411 of the sheet guide 41 is engaged with the circular gear 42. The circular gear 42 is connected with the variable resistor 43. Consequently, the circular gear 42 and the variable resistor 43 are synchronously rotated. When the sheet guide 41 is moved to comply with the width of the paper sheet, the circular gear 42 is correspondingly rotated and thus the variable resistor 43 generates an output signal. The resistance value of the output signal is varied according to the rotating amount of the circular gear 42. That is, the sheet size may be detected according to the resistance value of the output signal. Since the variable resistor 43 is not cost-effective, the sheet size detecting mechanism is still unsatisfied.

SUMMARY OF THE INVENTION

The present invention provides a scanning apparatus. The scanning apparatus comprises a sheet size detecting mechanism that is cost-effective and occupies small space.

In accordance with an aspect of the present invention, there is provided a scanning apparatus for scanning an image of at least one paper sheet. The scanning apparatus includes a sheet input tray, a scanning module, a transfer channel, a sheet pick-up module, and a sheet size detecting mechanism. The sheet input tray is used for placing the at least one paper sheet thereon. The scanning module includes an optical sensing element for reading the image of the at least one paper sheet at a scanning position. The sheet pick-up module is located near the sheet input tray for feeding the at least one paper sheet on the sheet input tray into the transfer channel. The sheet size detecting mechanism includes a first sheet guide part, a second sheet guide part, and a controlling unit. The first sheet guide part is disposed on the sheet input tray. The second sheet guide part is disposed on the sheet input tray. The second sheet guide part is movable relative to the sheet input tray, so that the first sheet guide part and the second sheet guide part are contactable with two parallel edges of the at least one paper sheet, respectively. At least one light-emitting unit is disposed on at least one of the first sheet guide part and the second sheet guide part for projecting a light beam onto the optical sensing element. According to the light beam, the optical sensing element generates a sensing signal. The controlling unit is electrically connected with the optical sensing element for receiving the sensing signal and acquiring a distance between the two parallel edges of the at least one paper sheet according to the sensing signal.

In an embodiment, the sheet pick-up module includes a sheet pick-up roller and a sheet separation assembly.

In an embodiment, the optical sensing element is a CMOS image sensor or a charge couple device.

In an embodiment, the sheet size detecting mechanism further includes a first rack, a second rack, and a circular gear. The first rack is connected with the first sheet guide part. The second rack is connected with the second sheet guide part, and parallel with the first rack. The circular gear is arranged between the first rack and the second rack, and engaged with the first rack and the second rack. When the first rack is moved in a first direction, the circular gear is driven to be rotated by the first rack. In response to rotation of the circular gear, the second rack is synchronously moved with the first rack in a second direction, wherein the second direction is reverse to the first direction.

In an embodiment, the scanning apparatus further includes plural light passageways. The light beam from the light-emitting unit is projected onto the optical sensing element through a specified light passageway of the plural light passageways.

In an embodiment, when the first sheet guide part and the second sheet guide part are respectively contacted with two parallel edges of the at least one paper sheet, the scanning module is located at a detecting position, and the specified light passageway of the plural light passageways is arranged between the light-emitting unit and the optical sensing element.

In an embodiment, the detecting position is different from the scanning position.

In an embodiment, the detecting position is the same as the scanning position.

In an embodiment, the specified light passageway of the plural light passageways is a linear passageway.

In an embodiment, the specified light passageway of the plural light passageways is a non-linear passageway. Moreover, at least one reflective element is disposed within the specified light passageway for changing a projecting direction of the light beam.

In an embodiment, the light-emitting unit is a light emitting diode or a laser source.

The above objects and advantages of the present invention will become more readily apparent to those ordinarily skilled in the art after reviewing the following detailed description and accompanying drawings, in which:

BRIEF DESCRIPTION OF THE DRAWINGS

FIG. 8 is a schematic cross-sectional view illustrating a portion of a scanning apparatus according to another embodiment of the present invention.

DETAILED DESCRIPTION OF THE PREFERRED EMBODIMENT

Figure 1:
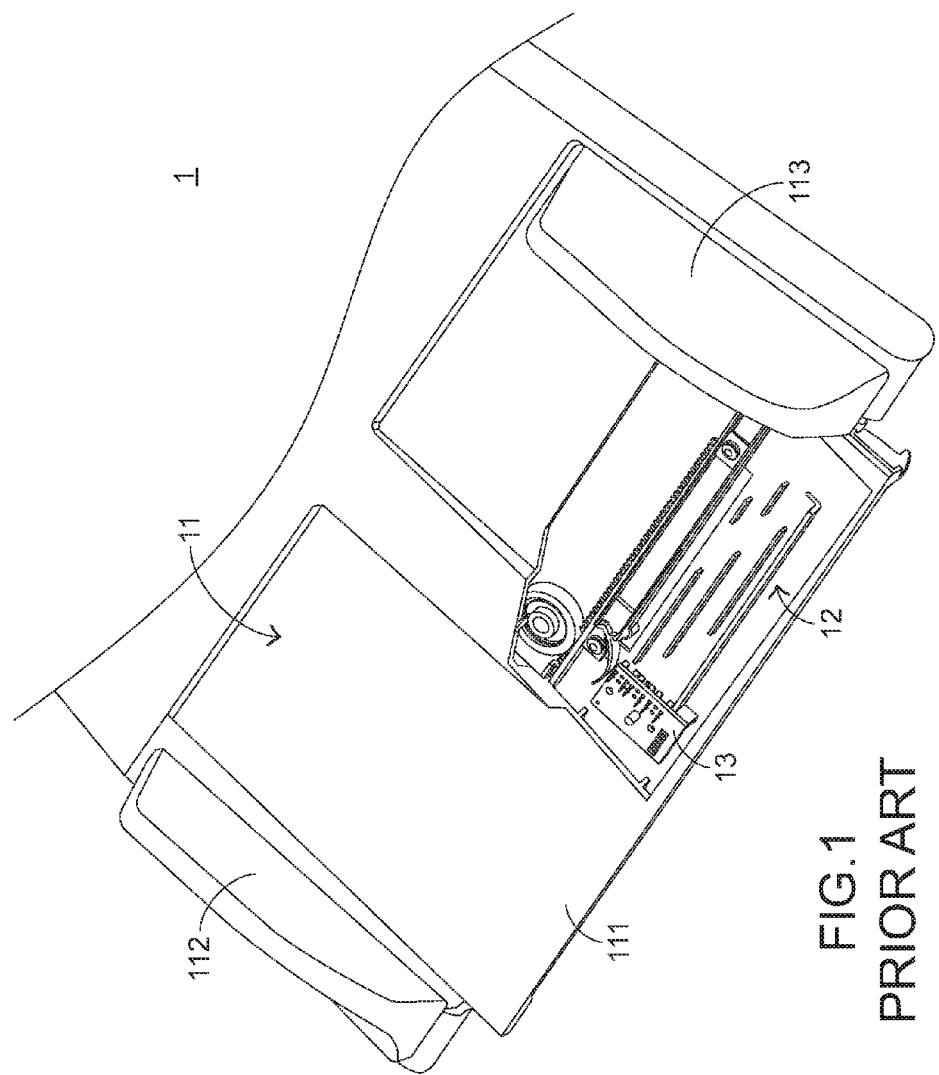
FIG. 1 is a schematic perspective view illustrating a conventional sheet size detecting mechanism.
Figure 2:
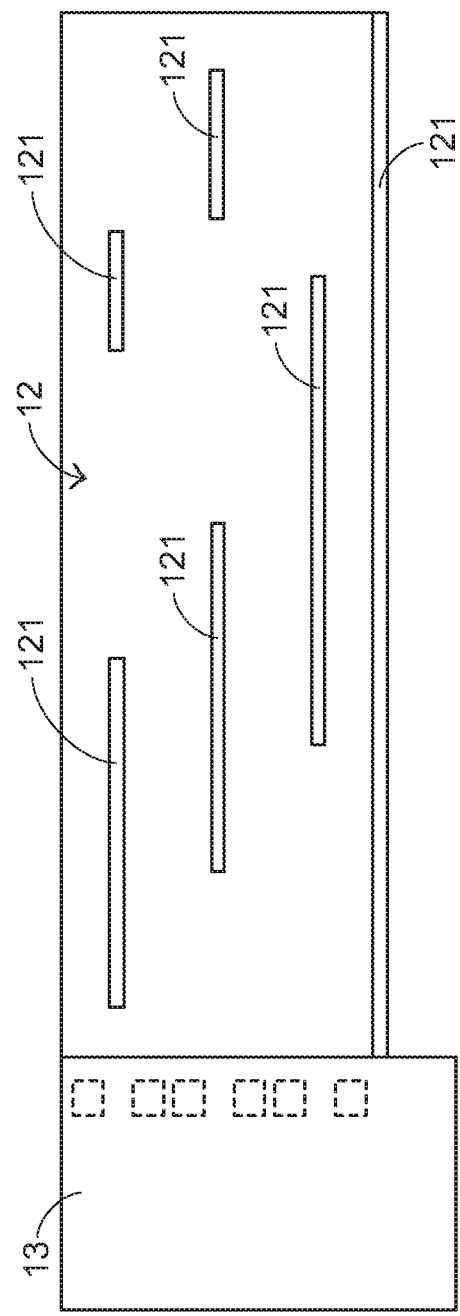
FIG. 2 is a schematic top view illustrating a logic plate and a sensing module of the sheet size detecting mechanism as shown in FIG. 1.
Figure 3:
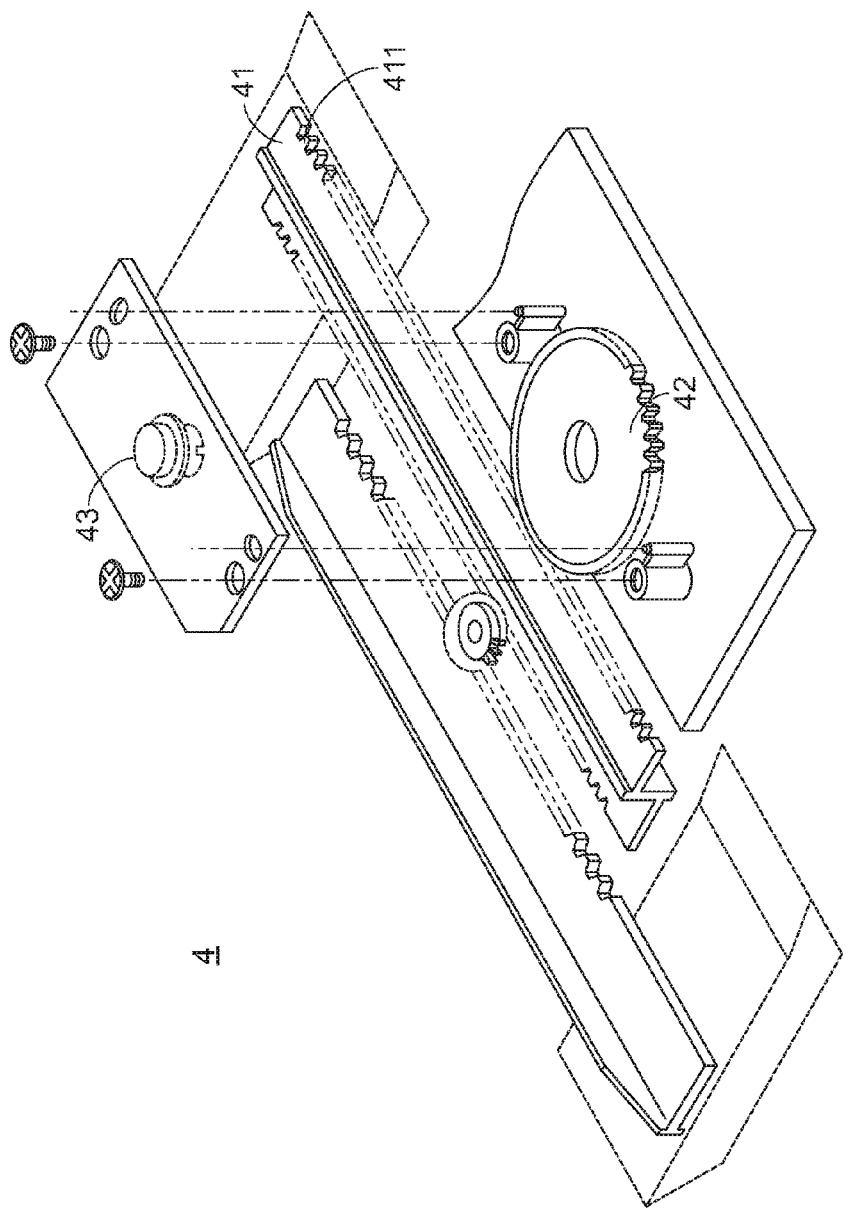
FIG. 3 is a schematic perspective view illustrating another conventional sheet size detecting mechanism.
Figure 4:
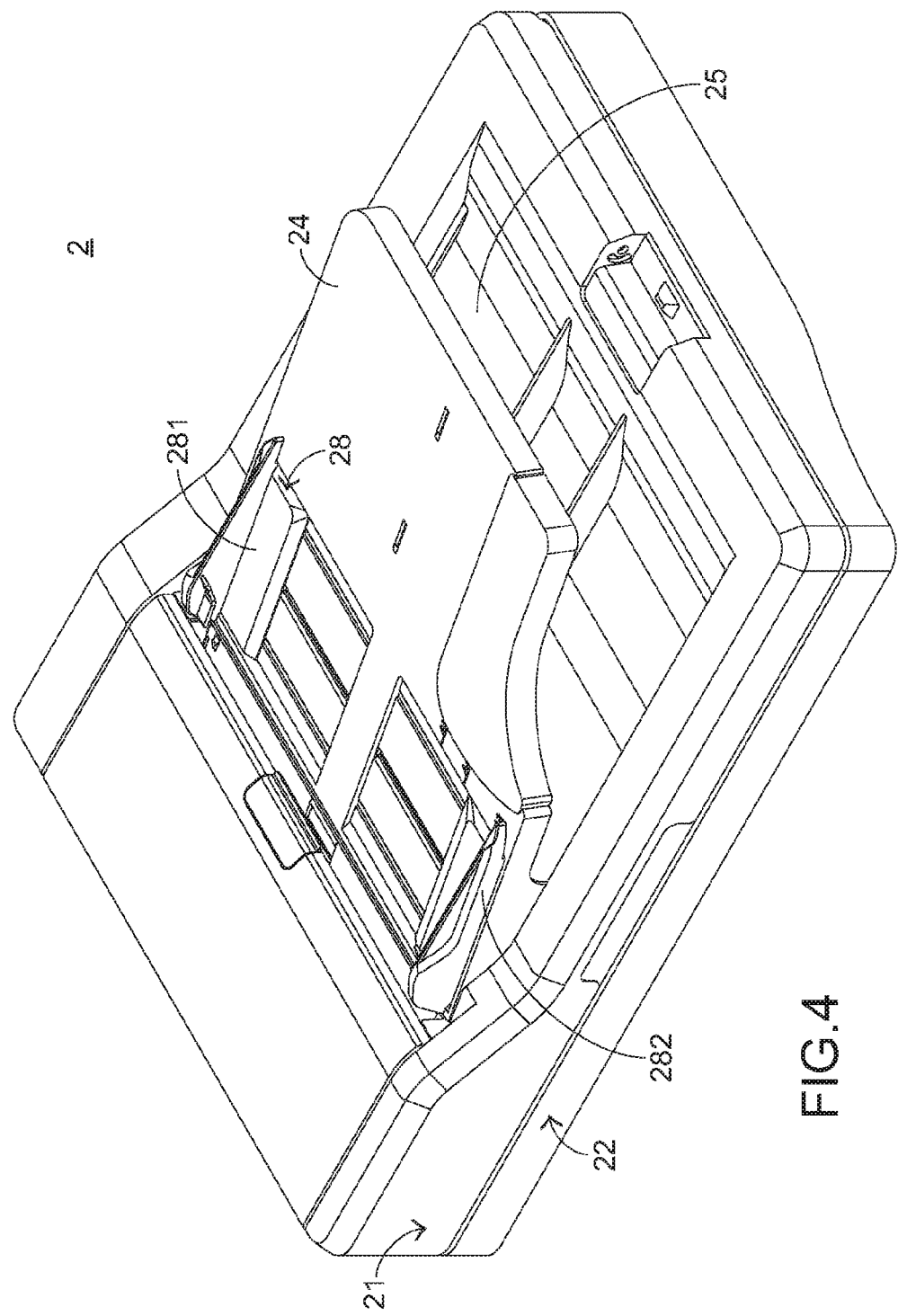
FIG. 4 is a schematic perspective view illustrating the outward appearance of a scanning apparatus according to an embodiment of the present invention.
Figure 5:
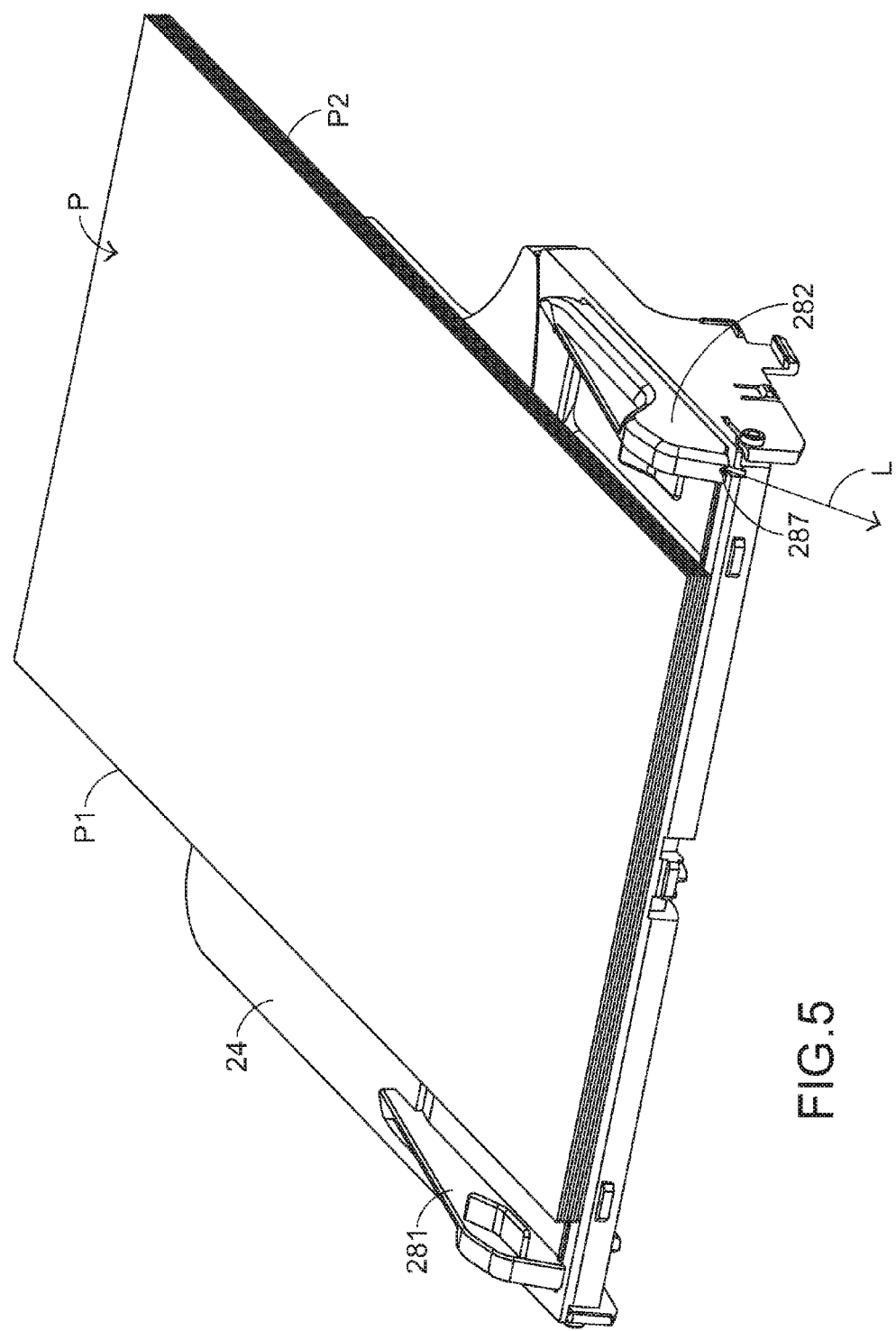
FIG. 5 is a schematic perspective view illustrating a sheet input tray of the scanning apparatus of FIG. 4.
Figure 6:
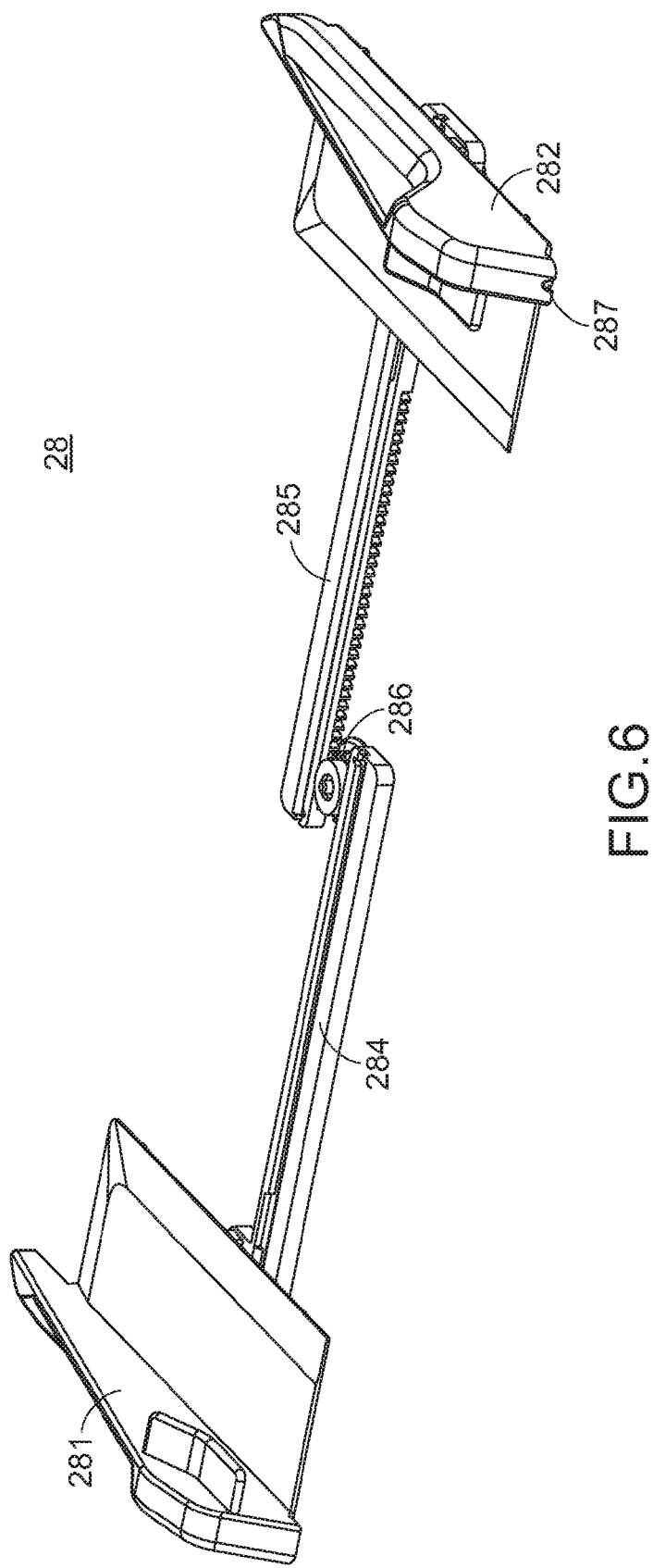
FIG. 6 is a schematic perspective view illustrating a portion of a sheet size detecting mechanism of the scanning apparatus of FIG. 4.
Figure 7:
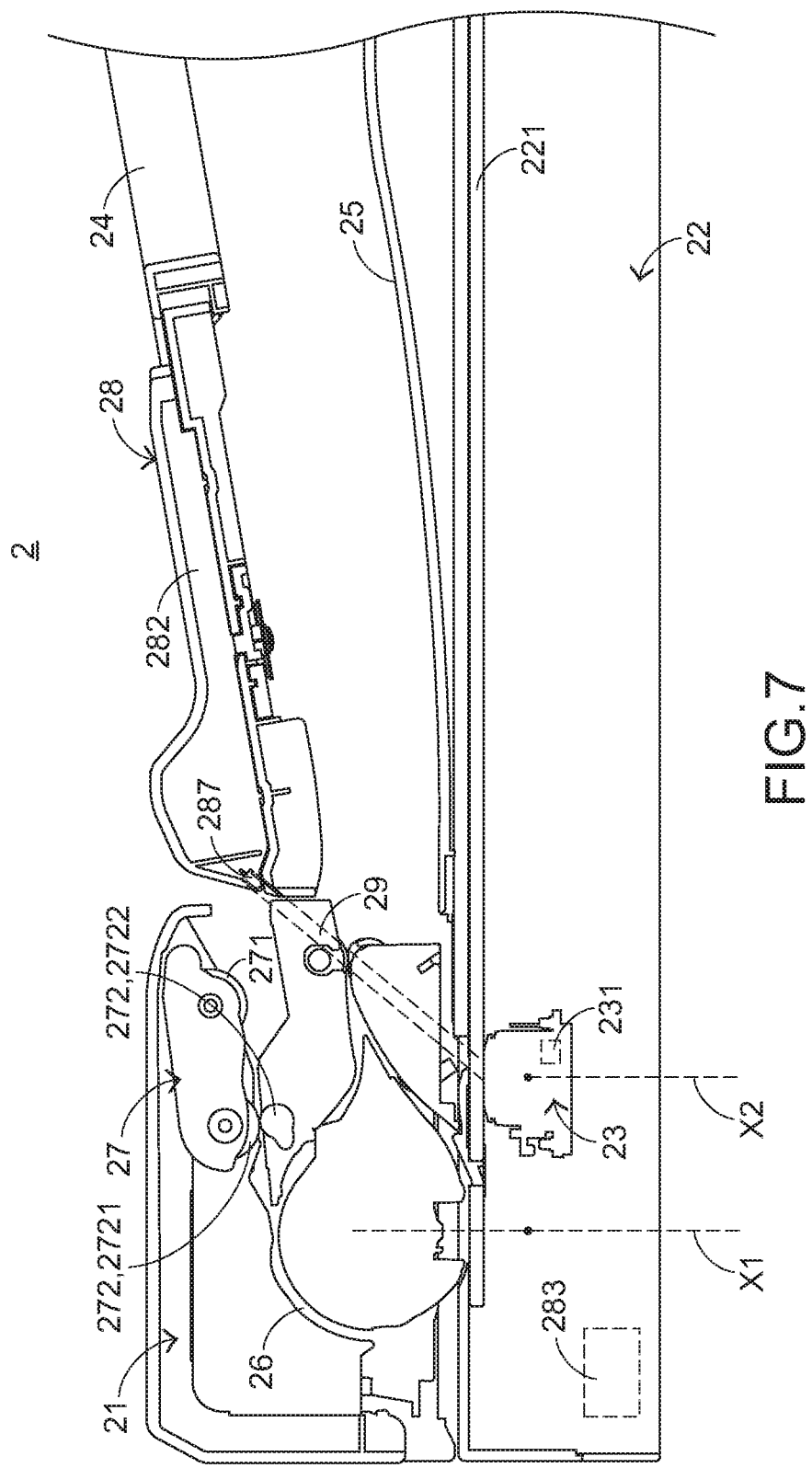
FIG. 7 is a schematic cross-sectional view illustrating a portion of the scanning apparatus of FIG. 4.

FIG. 4 is a schematic perspective view illustrating the outward appearance of a scanning apparatus according to an embodiment of the present invention. FIG. 5 is a schematic perspective view illustrating a sheet input tray of the scanning apparatus of FIG. 4. FIG. 6 is a schematic perspective view illustrating a portion of a sheet size detecting mechanism of the scanning apparatus of FIG. 4. FIG. 7 is a schematic cross-sectional view illustrating a portion of the scanning apparatus of FIG. 4.

Please refer to FIGS. 4, 5, 6 and 7. The scanning apparatus 2 comprises a covering member 21, a base 22, a scanning module 23, a sheet input tray 24, a sheet ejecting tray 25, a transfer channel 26, a sheet pick-up module 27, and a sheet size detecting mechanism 28. The covering member 21 is pivotally coupled to the base 22. Consequently, the covering member 21 may be rotated relative to the base 22 to be selectively in an open status or a close status. The scanning module 23 is disposed within the base 22. Moreover, the scanning module 23 comprises an optical sensing element 231. The sheet input tray 24 and the sheet ejecting tray 25 are both disposed on the covering member 21. The transfer channel 26 is arranged between the sheet input tray 24 and the sheet ejecting tray 25. The sheet pick-up module 27 is located near the sheet input tray 24.

Furthermore, the scanning apparatus 2 may be operated in a flatbed scanning mode or a sheetfed scanning mode. A process of scanning a paper sheet by the scanning apparatus 2 in the flatbed scanning mode will be illustrated as follows. Firstly, the covering member 21 is firstly opened and then the paper sheet is placed on a glass platform 221 of the base 22. Then, the covering member 21 is closed, so that the paper sheet is pressed by the covering member 21. Then, the scanning module 23 is moved from an end of the paper sheet to another end of the paper sheet in order to perform a linear scanning operation on the paper sheet. During the linear scanning operation is performed, the light beams reflected by the paper sheet are successively received by the optical sensing element 231, and converted into an electronic signal. According to the electronic signal, a complete image of the paper sheet is acquired. In an embodiment, the optical sensing element 231 is a CMOS image sensor (CIS), but is not limited thereto. For example, in some embodiments, the optical sensing element 231 is a charge coupled device (CCD). The operations of the scanning apparatus 2 in the flatbed scanning mode are well known to those skilled in the art, and are not redundantly described herein.

Furthermore, a process of scanning plural paper sheets P by the scanning apparatus 2 in the sheetfed scanning mode will be illustrated as follows. Firstly, the plural paper sheets P are placed on the sheet input tray 24 (see FIG. 5). Then, the plural paper sheets P are sequentially fed into the transfer channel 26 by the sheet pick-up module 27. When the paper sheet P is transmitted to the transfer channel 26, the scanning module 23 is moved to a scanning position X1. When the paper sheet P is transferred through the scanning position X1, a linear scanning operation is performed on the paper sheet P by the scanning module 23. During the linear scanning operation, the light beams reflected by the paper sheet P are successively received by the optical sensing element 231, and converted into an electronic signal. According to the electronic signal, a complete image of each paper sheet P is acquired. Moreover, after the paper sheet P is departed from the scanning position X1, the paper sheet P is outputted from a distal end of the transfer channel 26 and placed on the sheet ejecting tray 25.

In this embodiment, the sheet pick-up module 27 comprises a sheet pick-up roller 271 and a sheet separation assembly 272. When the sheet pick-up roller 271 is contacted with the uppermost paper sheet P of the plural paper sheets P, the uppermost paper sheet P is fed into the transfer channel 26. The sheet separation assembly 272 is used for separating the uppermost paper sheet P from underlying paper sheets P, so that only a single paper sheet P is allowed to be fed into the transfer channel 26 by the sheet pick-up module 27.

In this embodiment, the sheet separation assembly 272 comprises a sheet separation roller 2721 and a sheet separation pad 2722. During the paper sheet P is fed into the transfer channel 26 by the sheet pick-up roller 271, the sheet separation roller 2721 and the sheet separation pad 2722 provides a frictional force to the paper sheet P. For facilitating the sheet pick-up module 27 to feed a single paper sheet P into the transfer channel 26, the frictional forces resulted from the paper sheets P, the sheet separation pad 2722 and the sheet separation roller 2721 should be elaborately controlled. It is preferred that the frictional force U3 between the paper sheet P and the sheet separation roller 2721 is greater than the frictional force U1 between the paper sheet P and the sheet separation pad 2722, and the frictional force U1 is greater than the frictional force U2 between the adjacent paper sheets P (i.e. U3>U1>U2). Consequently, only a single paper sheet P is allowed to be fed into the transfer channel 26 by the sheet pick-up module 27. It is noted that the sheet pick-up module 27 is presented herein for purpose of illustration and description only.

Please refer to FIG. 5 again. Before the paper sheet P is scanned, the size of the paper sheet P on the sheet input tray 24 is detected by the sheet size detecting mechanism 28 of the scanning apparatus 2. After the size of the paper sheet P is detected, the subsequent task can be smoothly performed. For example, in a case that a printing device (not shown) is in cooperation with the scanning apparatus 2 to print out the image from the scanning apparatus 2 in real time, a blank paper sheet with a match size can be automatically provided by the printing device according to the sensing result of the sheet size detecting mechanism 28. Consequently, the printing task can be smoothly performed.

Please also refer to FIG. 6. The sheet size detecting mechanism 28 comprises a first sheet guide part 281, a second sheet guide part 282, and a controlling unit 283. The first sheet guide part 281 and the second sheet guide part 282 are disposed on the sheet input tray 24. The first sheet guide part 281 and the second sheet guide part 282 may be synchronously moved toward each other or away from each other until the first sheet guide part 281 and the second sheet guide part 282 are contacted with two parallel edges P1 and P2 of the paper sheet P, respectively. Under this circumstance, the size of the paper sheet P may be deduced by the controlling unit 283 according to the position of at least one of the first sheet guide part 281 and the second sheet guide part 282.

In this embodiment, the sheet size detecting mechanism 28 further comprises a first rack 284, a second rack 285, and a circular gear 286. The first rack 284 and the second rack 285 are connected with the first sheet guide part 281 and the second sheet guide part 282, respectively. Consequently, the first rack 284 and the second rack 285 are synchronously moved with the first sheet guide part 281 and the second sheet guide part 282, respectively. The circular gear 286 is arranged between the first rack 284 and the second rack 285, and engaged with the first rack 284 and the second rack 285.

In a case that one of the first rack 284 and the second rack 285 is moved in a specified direction, the circular gear 286 is driven to be rotated. Upon rotation of the circular gear 286, the other one of the first rack 284 and the second rack 285 is synchronously moved in a reverse direction. Consequently, the first sheet guide part 281 and the second sheet guide part 282 may be synchronously moved toward each other or synchronously moved away from each other until the first sheet guide part 281 and the second sheet guide part 282 are contacted with the two parallel edges P1 and P2 of the paper sheet P, respectively.

In the above embodiment, the way of allowing the first sheet guide part 281 and the second sheet guide part 282 to be contacted with two parallel edges P1 and P2 of the paper sheet P is presented herein for purpose of illustration and description only. It is noted that numerous modifications and alterations may be made while retaining the teachings of the invention. For example, in some other embodiments, only one of the first sheet guide part 281 and the second sheet guide part 282 is movable, but the other one of the first sheet guide part 281 and the second sheet guide part 282 is fixed. In such way, the purpose of allowing the first sheet guide part 281 and the second sheet guide part 282 to be contacted with the two parallel edges P1 and P2 of the paper sheet P can be also achieved.

The spirit of the scanning apparatus of the present invention will be illustrated in more details as follows. In this embodiment, a light-emitting unit 287 is disposed on the second sheet guide part 282. Consequently, the light-emitting unit 287 is synchronously moved with the second sheet guide part 282. Preferably, the light-emitting unit 287 is a light emitting diode or a laser source. The light-emitting unit 287 is used for emitting a light beam L to the optical sensing element 231 of the scanning module 23. As the second sheet guide part 282 is moved, the light-emitting unit 287 is synchronously moved with the second sheet guide part 282. In a case that the position of the light-emitting unit 287 is changed, the light beam L from the light-emitting unit 287 is projected onto a different position of the scanning module 23. After the light beam L is received by the optical sensing element 231, the optical sensing element 231 generates a corresponding sensing signal. The sensing signal is transmitted to the controlling unit 283, which is electrically connected with the optical sensing element 231. According to the sensing signal, the distance between the two parallel edges P1 and P2 of the paper sheet P can be acquired.

Moreover, in this embodiment, plural light passageways 29 are disposed within the covering member 21. Before the light beam L is emitted by the light-emitting unit 287, the scanning module 23 is moved to a detecting position X2, so that the scanning module 23 is located at the outlet ends of the plural light passageways 29. When the first sheet guide part 281 and the second sheet guide part 282 are contacted with the two parallel edges P1 and P2 of the paper sheet P, the light-emitting unit 287 on the second sheet guide part 282 is located near an inlet end of a corresponding light passageway of the plural light passageways 29. Consequently, the light beam L from the light-emitting unit 287 can be projected onto the scanning module 23 through the corresponding light passageway 29.

Especially, the positions of the outlet ends of the plural light passageways 29 are determined according to the sizes of various general paper sheets. For example, the scanning apparatus 2 may be designed to have plural light passageways 29 corresponding to an A3-sized paper sheet, an A4-sized paper sheet, an A5-sized paper sheet, a B4-sized paper sheet and a B5-sized paper sheet. Moreover, each of the plural light passageways 29 may be produced by forming at least one through-hole in at least one component of the covering member 21. For designing the detecting position X2 of the scanning module 23, the number of the through-holes should be as small as possible. In this embodiment, the plural light passageways 29 are linear passageways. Moreover, the detecting position X2 of the scanning module 23 is different from the scanning position X1, but is not limited thereto. It is noted that numerous modifications and alterations of the plural light passageways 29 may be made according to the practical requirements. For example, any one of the plural light passageways 29 may be a non-linear passageway (e.g. an arc-shaped passageway or a curvy passageway) according to the practical requirements.

FIG. 8 is a schematic cross-sectional view illustrating a portion of a scanning apparatus according to another embodiment of the present invention. In comparison with the above embodiment, the detecting position X2' of the scanning module 23 of the scanning apparatus 2' of this embodiment is the same as the scanning position X1'. Consequently, the power consumption for moving the scanning module 23 can be saved. Furthermore, in this embodiment, each of the plural light passageways 29' is a non-linear passageway with a bent part. A reflective element 291 (e.g. a reflective mirror) is located at the bent part of the corresponding light passageway 29'. The light beam L from the inlet end of the light passageway 29' is reflected by the reflective element 291 and directed to the outlet end of the light passageway 29'. Consequently, the light beam L from the light-emitting unit 287 can be projected onto the scanning module 23 through a corresponding light passageway 29'. The configurations of other components of the scanning apparatus 2' are substantially identical to those of the scanning apparatus 2 of the above embodiment, and are not redundantly described herein.

In the above two embodiments, the light-emitting unit 287 is disposed on the second sheet guide part 282. It is noted that numerous modifications and alterations may be made while retaining the teachings of the invention. For example, according to the practical requirements, the light-emitting unit 287 may be disposed on the first sheet guide part 281. Alternatively, two light-emitting units 287 may be disposed on the first sheet guide part 281 and the second sheet guide part 282, respectively. Moreover, as the number of the light-emitting units 287 is or the position of the light-emitting unit 287 is changed, the number and positions of the light passageways 29 or 29' are correspondingly adjusted. The ways of adjusting the number and the positions of the light passageways 29 or 29' are similar to those of the above two embodiments, and are not redundantly described herein.

Moreover, in the above two embodiments, a single light-emitting unit is disposed on a single sheet guide part. It is noted that numerous modifications and alterations may be made according to the practical requirements. For example, in some other embodiments, at least two light-emitting units are disposed on a single sheet guide part. In some situations, it is unable to form through-holes in some positions of some components of the covering member 21. When the first sheet guide part 281 and the second sheet guide part 282 are respectively contacted with the two parallel edges P1 and P2 of the paper sheet P, the light beam L emitted by a single light-emitting unit 287 is possibly hindered and unable to be projected onto the scanning module 23. On the other hand, the additional light-emitting unit (or another light-emitting unit) on the single sheet guide part may emit an additional light beam, and the possibility of allowing the additional light beam to be projected onto the scanning module is increased. Under this circumstance, the efficacy of assisting in detecting the size of the paper sheet P will be enhanced.

From the above descriptions, the present invention provides a scanning module. A sheet size detecting mechanism of the scanning apparatus is additionally equipped with a light-emitting unit. The light-emitting unit is synchronously rotated with a sheet guide part of the sheet size detecting mechanism. Moreover, an optical sensing element originally installed within a scanning module is used for receiving a light beam from the light-emitting unit. According to the light beam, the position of the sheet guide part is judged, and thus the size of a paper sheet is acquired. In comparison with the conventional sheet size detecting mechanism, the sheet size detecting mechanism of the scanning apparatus of the present invention is more cost-effective and occupies smaller space. In other words, the scanning apparatus of the present invention has enhanced industrial value.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A scanning apparatus for scanning an image of at least one paper sheet, said scanning apparatus comprising:
 a sheet input tray for placing the at least one paper sheet thereon;
 a scanning module comprising an optical sensing element for reading said image of said at least one paper sheet at a scanning position;
 a transfer channel;
 a sheet pick-up module located near said sheet input tray for feeding said at least one paper sheet on said sheet input tray into said transfer channel; and
 a sheet size detecting mechanism comprising:
  a first sheet guide part disposed on said sheet input tray;
  a second sheet guide part disposed on said sheet input tray, wherein said second sheet guide part is movable relative to said sheet input tray, so that said first sheet guide part and said second sheet guide part are contactable with two parallel edges of said at least one paper sheet, respectively, wherein at least one light-emitting unit is disposed on at least one of said first sheet guide part and said second sheet guide part for projecting a light beam onto said optical sensing element, wherein according to said light beam, said optical sensing element generates a sensing signal; and
  a controlling unit electrically connected with said optical sensing element for receiving said sensing signal and acquiring a distance between said two parallel edges of said at least one paper sheet according to said sensing signal.

2. The scanning apparatus according to claim 1, wherein said sheet pick-up module comprises a sheet pick-up roller and a sheet separation assembly.

3. The scanning apparatus according to claim 1, wherein said optical sensing element is a CMOS image sensor or a charge coupled device.

4. The scanning apparatus according to claim 1, wherein said sheet size detecting mechanism further comprises:
 a first rack connected with said first sheet guide part;
 a second rack connected with said second sheet guide part, and parallel with said first rack; and
 a circular gear arranged between said first rack and said second rack, and engaged with said first rack and the second rack, wherein when said first rack is moved in a first direction, said circular gear is driven to be rotated by said first rack, wherein in response to rotation of said circular gear, said second rack is synchronously moved with said first rack in a second direction, wherein said second direction is reverse to said first direction.

5. The scanning apparatus according to claim 1, further comprising plural light passageways, wherein said light beam from said light-emitting unit is projected onto said optical sensing element through a specified light passageway of said plural light passageways.

6. The scanning apparatus according to claim 5, wherein when said first sheet guide part and said second sheet guide part are respectively contacted with two parallel edges of said at least one paper sheet, said scanning module is located at a detecting position, and said specified light passageway of said plural light passageways is arranged between said light-emitting unit and said optical sensing element.

7. The scanning apparatus according to claim 6, wherein said detecting position is different from said scanning position.

8. The scanning apparatus according to claim 6, wherein said detecting position is the same as said scanning position.

9. The scanning apparatus according to claim 6, wherein said specified light passageway of said plural light passageways is a linear passageway.

10. The scanning apparatus according to claim 6, wherein said specified light passageway of said plural light passageways is a non-linear passageway, wherein at least one reflective element is disposed within said specified light passageway for changing a projecting direction of said light beam.

11. The scanning apparatus according to claim 1, wherein said light-emitting unit is a light emitting diode or a laser source.

\* \* \* \* \*